Dec. 23, 1924.

D. McKAY 1,520,425

DIRIGIBLE HEADLIGHT

Filed March 18, 1924   2 Sheets-Sheet 1

Inventor
D. McKay
By C. A. Snow & Co.
Attorneys.

Dec. 23, 1924.
D. McKAY
1,520,425
DIRIGIBLE HEADLIGHT
Filed March 18, 1924    2 Sheets-Sheet 2
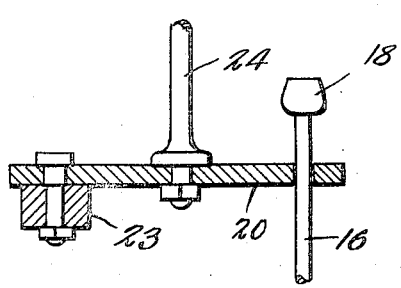
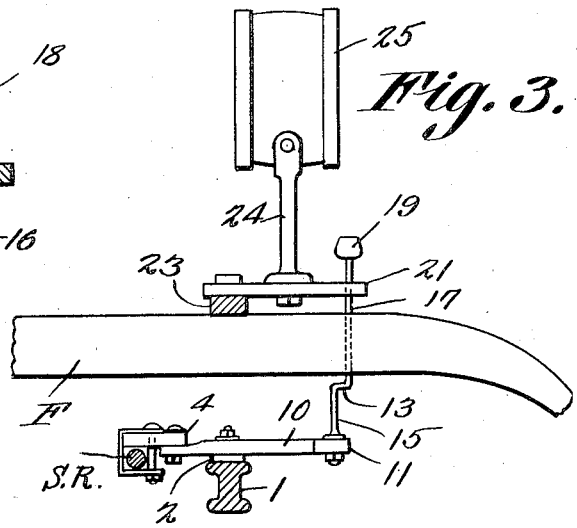
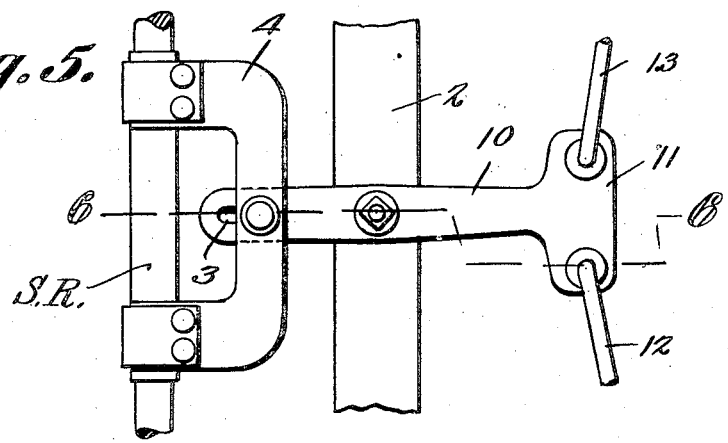
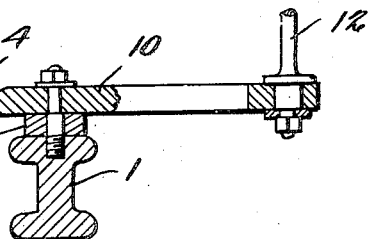
Inventor
D. McKay
By C.A. Snow & Co.
Attorneys.

Patented Dec. 23, 1924.

1,520,425

UNITED STATES PATENT OFFICE.

DONALD McKAY, OF MONTGOMERY, ALABAMA.

DIRIGIBLE HEADLIGHT.

Application filed March 18, 1924. Serial No. 700,138.

*To all whom it may concern:*

Be it known that I, DONALD MCKAY, a citizen of the United States, residing at Montgomery, in the county of Montgomery and State of Alabama, have invented a new and useful Dirigible Headlight, of which the following is a specification.

This invention relates to automobile headlights and more particularly to dirigible headlights.

The object of the invention is to produce simple and efficient means operated automatically in conjunction with the steering mechanism of a vehicle of the class described whereby the headlights are turned simultaneously with the steering wheels at the front of the machine for the purpose of directing the illuminating rays, from the headlights upon that portion of the roadway about to be followed by the machine in accordance with the angle of the steering wheels.

Another object is to provide a headlight steering mechanism which is extremely simple in constructon yet durable and efficient in service and may be easily and readily applied to any standard form of automobile without requiring any change in the parts thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings—

Fig. 3 is a detailed sectional view on the line 3—3, Fig. 1.

Fig. 4 is a detailed longitudinal section of the headlight mounting.

Fig. 5 is a detail plan view showing a portion of the headlight steering mechanism, and Fig. 6 is a sectional view taken on the line 6—6 of Fig. 5.

Figure 1:
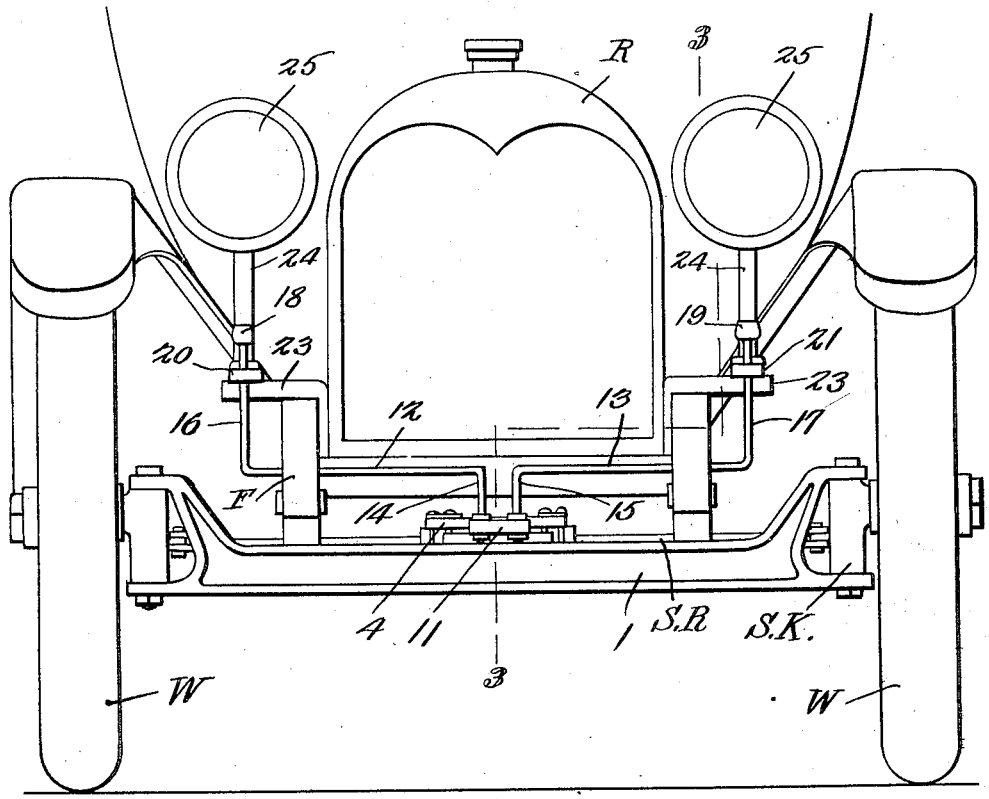
Figure 1 represents a front elevation of an automobile equipped with this improved dirigible headlight.

In the drawings, wherein like characters of reference designate corresponding parts, the headlights 25 are shown positioned on each side of the radiator R and supported on the vehicle springs S above the front axle 1. This axle 1 is supported by the usual front wheels W, the steering knuckles SK of which allow the wheels to be turned relative to the axle by means of the steering rod SR which connects the knuckles, and which is actuated by the steering post of the automobile, not shown. Nothing new is claimed with reference to the parts thus far described.

A plate or block 2 is secured to the upper face of the axle 1 midway the length thereof and has fulcrumed thereon intermediate the length thereof a lever 10. The rear end of this lever 10 is longitudinally slotted as shown at 3 and is pivotally connected with a U-shaped bracket 4 the arms of which are fixed to the steering rod SR, the lever being pivoted to the cross bar of the bracket by a pintle extending through the slot 3.

The front end of the lever 10 has a T-shaped head 11 with the ends of which are pivotally connected lamp steering rods 12 and 13 the body portions of which are disposed horizontally and which are provided at their inner ends with downturned arms 14 and 15 which are engaged by the head 11. These rods 12 and 13 are provided at their outer ends with upstanding arms 16 and 17 which pass loosely through swingably mounted bars 20 and 21 which carry the lamps 25. These bars 20 and 21 are pivotally mounted at one end on brackets 23 secured to the side bars of the frame or chassis F.

Bolts 24 of the lamps 25 extend through the bars 20 and 21 intermediate the ends thereof and are fixedly secured thereto so that when these bars swing laterally the lamps will turn with them.

Figure 2:
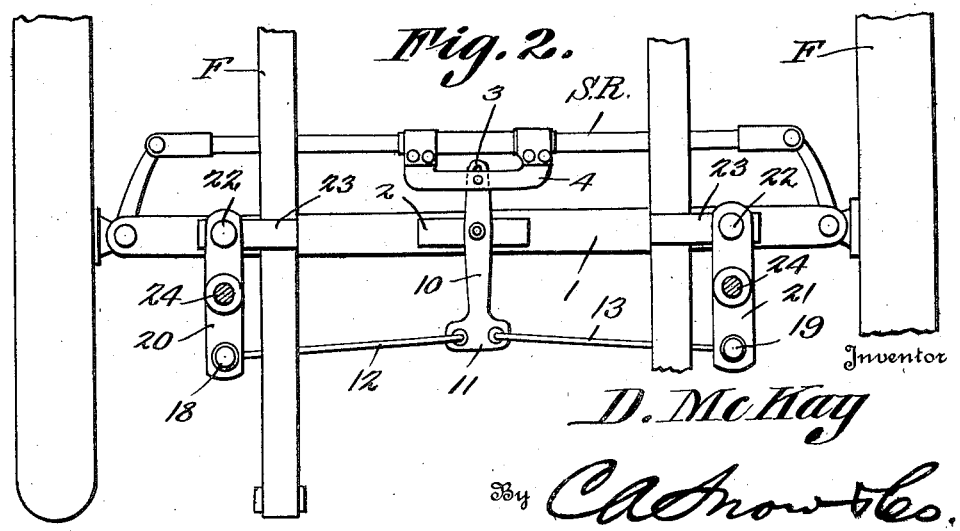
Fig. 2 is a top plan view of the mechanism constituting this invention shown applied the lamp post being in section.

The upstanding arms 16 and 17 of the rods 12 and 13 are equipped with heads 18 and 19. The rod arms 16 and 17 project some distance through the bears 20 and 21 so as to prevent jolts and jars incident to the passage of the wheels over rough surfaces from being transmitted to the lamps. From the above description it will be obvious that when the lamps are mounted as shown in Figs. 1 and 2 and connected with the steering rod SR through the actuating rods 12 and 13 and the lever 10, the turning of the front wheels W will cause the lever 10 to swing on its fulcrum according to the direction in which the wheels are turned shifting the head 11 in the same direction that the wheels are turned thus causing the bars 20 and 21 to also turn in the same direction turning the lamps 25 with them whereby the illuminating rays from the lamps will be directed upon that portion of the roadway about to be followed by the machine.

From the above description it will be seen that this headlight steering mechanism is very simple in construction yet strong and durable and has no springs or similar parts to get out of order and after the mechanism is once installed no further attention is required, it being automatically controlled by the turning of the wheels W.

What is claimed is:—

1. A dirigible lamp actuating mechanism including brackets for connection with the frame of an automobile, lamp carrying bars pivoted at one end on said brackets to swing in a horizontal plane, lamps carried by said bars intermediate the ends thereof, a T-shaped lever to be fulcrumed intermediate its ends on the front axle of the automobile in connection with which the device is to be used, means for pivotally connecting one end of said lever with the steering rod of an automobile whereby the lever is shifted on the movement of said rod, horizontally disposed lamp steering rods, the body portions of which are arranged horizontally and which are provided at their inner ends with down turned arms adapted to be engaged with the front end of said lever, the outer ends of said rods having upstanding arms extended loosely through the front ends of said lamp carrying bars and projected above said bars and provided with heads to hold them against withdrawal.

2. The combination with the side bars, front axle and steering rod of an automobile; of brackets carried by said side bars, a lever fulcrumed intermediate its ends on said axle, a U-shaped bracket secured at its ends to said steering rod, one end of said lever having a pin and slot connection with the cross bar of said U-shaped bracket, the other end of said lever having laterally spaced apertures, lamp carrying bars pivoted at one end to swing horizontally on said first mentioned brackets, lamp actuating rods having one end down-turned and loosely mounted in the apertures in said lever end, said rods extending in opposite directions from said lever and having upturned outer ends pivotally engaged with the free ends of said levers or lamp carrying bars whereby the longitudinal movement of the steering rod will simultaneously turn said lamps.

In testimony that I claim the foregoing as my own, I have hereto affixed my signature in the presence of two witnesses.

DONALD McKAY.

Witnesses:
W. M. PARKER,
D. C. KNOX.